(No Model.) 2 Sheets—Sheet 2.
J. B. AMMONS.
COTTON CHOPPER.
No. 414,477. Patented Nov. 5, 1889.
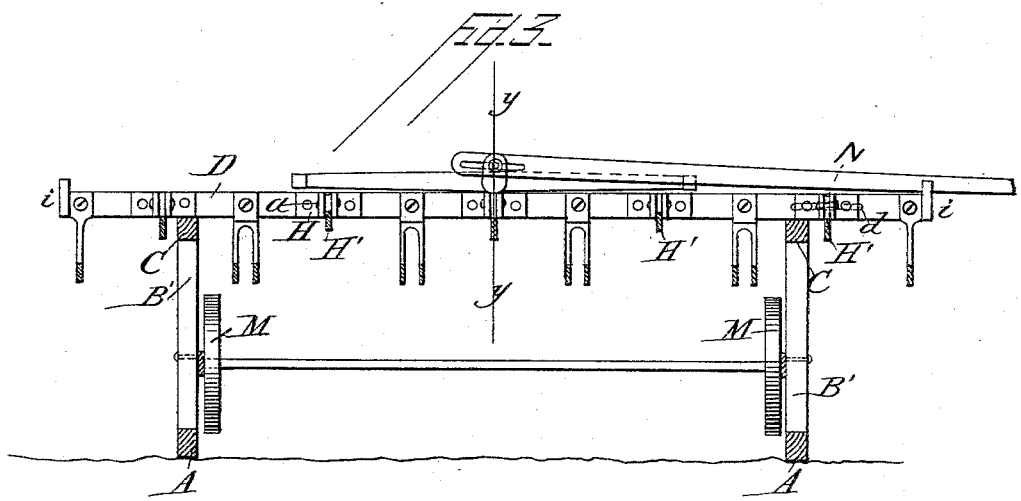
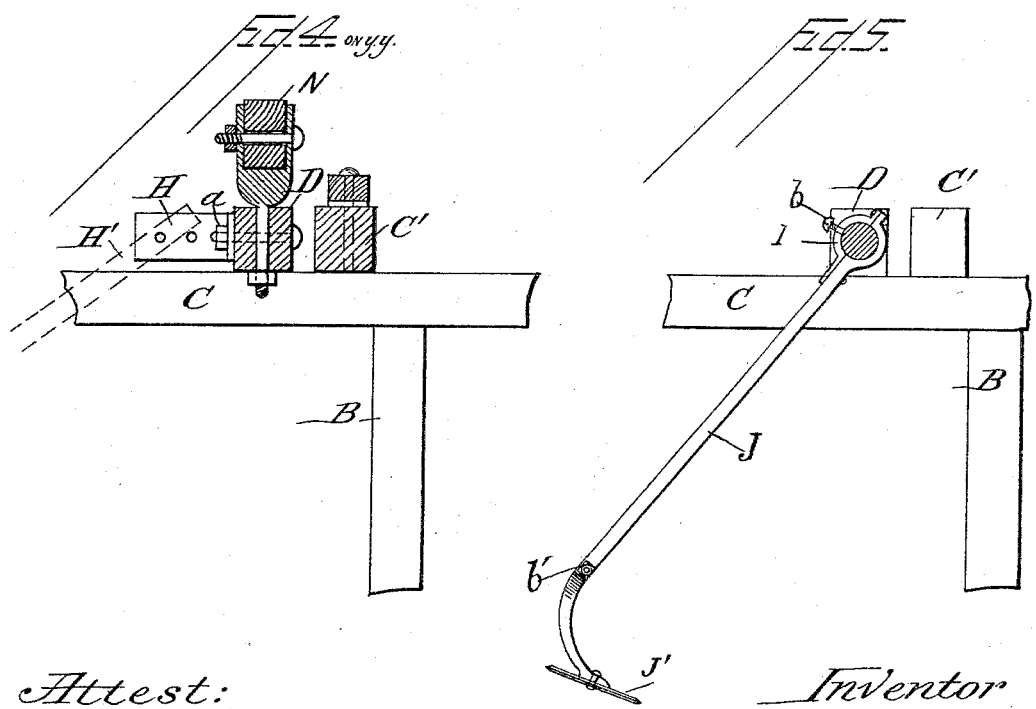
Attest:
F. H. Schott
G. Burroughs.
Inventor
John B. Ammons
By W. E. Chandler
Atty
N. PETERS, Photo-Lithographer, Washington, D. C.

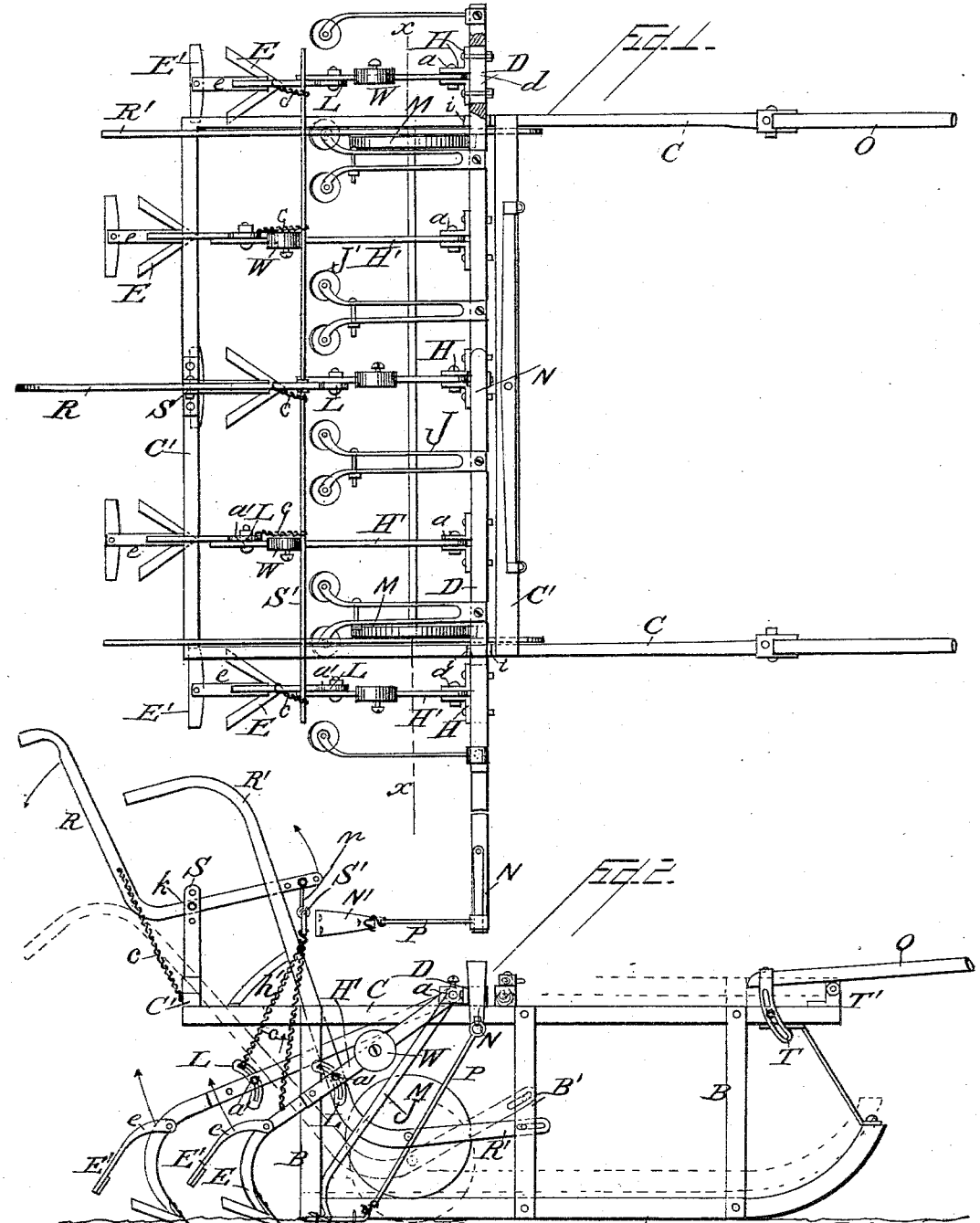

UNITED STATES PATENT OFFICE.

JOHN B. AMMONS, OF COLUMBIA, SOUTH CAROLINA.

COTTON-CHOPPER.

SPECIFICATION forming part of Letters Patent No. 414,477, dated November 5, 1889.

Application filed March 29, 1889. Serial No. 305,221. (No model.)

*To all whom it may concern:*

Be it known that I, JOHN B. AMMONS, a citizen of the United States, residing at Columbia, in the county of Richland and State of South Carolina, have invented certain new and useful Improvements in Cotton-Choppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in that class of cotton-choppers which are drawn across the rows of growing cotton to remove portions of the plants, leaving at intervals the desired quantity of growing stalks.

A further object is to provide a machine simple, economical, and durable in construction, and which will do its work in an efficient manner. I attain these objects by the mechanism illustrated in the accompanying drawings, in which—

Figure 1 is a plan view of the entire machine. Fig. 2 is a side elevation. Fig. 3 is a transverse vertical section on the line $x\,x$ of Fig. 1. Fig. 4 is a vertical section on the line $y\,y$ of Fig. 3. Fig. 5 is a similar section showing the method of attaching the disks.

Similar letters refer to like parts throughout the several views.

The operative parts of the machine are carried by the frame consisting of the longitudinal pieces C, united by the transverse bars C'. This frame is carried by runners A. The standards B, which connect the runners and the frame, elevate the latter to the proper distance above the ground.

It has been found that on many kinds of soil (particularly light or soft) runners are much to be preferred to wheels, as they do not cut into the ground so deeply, thus preventing the formation of water-channels, through which in heavy rains the light soil is carried away and deep furrows or gulleys left in its place. It has also been found that they carry the machine steadier and keep a truer course than wheels.

Several parts of my invention may be used in connection with machines carried by wheels; but I will confine myself to such relations as they bear to a machine carried on runners.

On the longitudinal pieces C, about midway of the length of the frame, is fastened the transverse bar D, extending beyond the machine on both sides. At suitable intervals this bar is slotted horizontally for the reception of the bolts that retain the lugs $a\,a$ in place. These lugs form one part of the hinged joint H, connecting the pivoted standard H', carrying the plows and scrapers to said bar. These slots $d$ are elongated sufficiently to allow a transverse adjustment of the standards. Said standards are made in two parts connected by a link-joint L, which joint, by means of a bolt $a'$, allows the lower part of the standard to be placed at an angle to the upper part. This lower part is curved so that the plow E attached to it will be in the proper position to enter the ground as the apparatus is drawn forward. The pitch of the plow regulating the depth to which it is to go is adjusted by means of the bolt $a'$ and the link-joint. Just above the bend in the lower section of the standards is attached by a pivotal joint the spring-support $e$, carrying the scraper E'. The spring of the support $e$ allows the scraper to adapt itself to the unevenness of the soil. The scraper forces earth up around the plants after the plows have passed. A weight W slides on the upper section of the standard and regulates the pressure on the plows when it is necessary to increase said pressure as the hardness of the soil calls for it. The weight is brought down near to the joint L; but if less pressure is needed it is moved up into proximity with the joint H. The weight is held in place when adjusted by a set-screw $e'$, passing through one side and bearing against the standard.

To the rear transverse bar C' is attached the standard S, made of two plates of iron bolted to said bar, and with sufficient space between them for the lever R, which is adjustably secured in place. This adjustment is accomplished by means of a series of holes in the standard and lever and bolt $k$, passed through both, upon which the lever is fulcrumed. A yoke $n$ (best shown in Fig. 2) connects this lever with the cross-bar S', which has the standards H', carrying the plows connected with it by the chains $c$ $c$. When it is desired to raise the plows from contact with the ground, the lever is drawn back, which raises them by means of the cross-piece and chains. Chains $c'$ are attached to the rear transverse cross-piece C and engage with hooks on the levers R, for the purpose of securing said levers when drawn back and keeping the plows raised while transporting the machine from one place to another.

As it would be difficult to turn the machine on its runners in a small space, and as the draft would be much increased when transporting over rough roads, I provide the machine with wheels, which may or may not take the place of the runners, as desired.

Arms or levers R' R' are pivoted at their lower ends to the middle standards B'. In these arms the axles of the wheels M are journaled. These arms are S-shaped and extend upward through the frame-work and backward under the cross-piece S' and over the rear transverse piece C', so as to be easily grasped by the driver. When it is desired to use the wheels, the levers R' are drawn back or depressed, and, acting with the wheels as a fulcrum, raise the entire machine off the ground, resting entirely on the wheels. The spring-catches $h'$, secured to the frame, hold the levers in a position to keep the wheels off the ground.

A land-marker N' is attached to the middle of the transverse piece D by an arm N, the connections being by a hinge-joint, which allows it to be easily shifted from one side of the machine to the other. Near the ends of the transverse piece D are placed the sockets $i$, which hold the arm N, carrying the marker in place after it is adjusted. This marker consists of the hanger P, turning loosely on the outer end of the arm N, and the small harrow N', attached to the end of the hanger by swivel-connection. This harrow I find is better in practice than a hook or the ordinary marker used, as it leaves a broad well-defined mark and is less liable to catch and jump from side to side.

The shafts O are attached to the front ends of the longitudinal pieces C by means of hinged joints T', placed at the ends of the longitudinal pieces of the frame and at a short distance from the ends of the shaft. To the ends of the shaft and near the ends of the longitudinal pieces are attached the slotted curved strips T, which are held in any desired position by the bolts passing through said slots and the side pieces C.

It will be seen that the plows E and scrapers E' are arranged in such a manner, by means of longer and shorter connections with the beam D, that they are alternately nearer to and farther from the beam, and that the flexibility of their connections with said beam allows them to automatically adjust themselves to all inequalities of surface, thus producing an equal effect upon the rows of cotton as the machine is drawn over them.

As it is sometimes necessary to provide means for cutting up weeds and stirring the earth in close proximity to the cotton left standing, I attach by means of collars I, passing around the bar D between the attachments for the plows and held in place on said bars by set-screws $b$, the spring-arms J. These arms where they come in between the plows are made in pairs, the distance at which their lower ends are separated being controlled by a bolt $b'$. To the lower end of each arm J is pivoted a steel disk J', which as the machine is drawn forward cuts the weeds and stirs the ground close to the plants left standing, the machine being capable, therefore, of not only removing the useless cotton-plants, but of thoroughly cultivating the ground around those left standing.

Having thus described my invention, I claim as new, and desire to secure by Letters Patent, the following:

1. As an improvement in cotton-choppers, the frame mounted upon runners and carrying a cross-bar S, in combination with the jointed standards hinged to said bar, the plows carried upon their lower ends, and the spring-scrapers secured to the standards and following the plows, substantially as shown and described.

2. As an improvement in cotton-choppers, the frame-bar D and the hinged and jointed standards carrying the plows and scrapers, in combination with the sliding weights W and the means for securing said weights in position, substantially as set forth and described.

3. In a cotton-chopper, the frame mounted upon runners, as set forth, in combination with the wheels carried upon an axle journaled in levers pivoted to the standards B of said frame and adapted to raise the runners from the ground and retain them in that position as long as desired.

4. In a cotton-chopper, the combination, with the frame, of the levers R', pivoted to the standards B of said frame, the wheels M, their axle journaled in said levers, and spring-clutches $h'$, attached to the frame and adapted to retain the levers in position when the wheels are either elevated or in contact with the ground, substantially as specified.

5. In a cotton-chopper, the combination, with the bar D, of the collars I, secured to said bar, the spring-arms J, adjusting-bolt $b'$, and rotatable disks J', adapted, as shown and described, to cut the weeds and stir the earth in close proximity to the standing cotton, as specified.

6. In a cotton-chopper, the combination of the bar D, the spring-arms J, the disks J', and standards H', carrying plows E and scrapers E', all arranged for joint operation substantially as shown and described.

In testimony whereof I affix my signature in presence of two witnesses.

JOHN B. AMMONS.

Witnesses:
G. N. WILLIAMS,
W. M. FOX.